US007455254B1

(12) United States Patent
Goker et al.

(10) Patent No.: US 7,455,254 B1
(45) Date of Patent: Nov. 25, 2008

(54) METHOD AND APPARATUS OF MAINTAINING TENSION IN A TAPE

(75) Inventors: Turguy Goker, Solana Beach, CA (US); John A. Hamming, Laguna Niguel, CA (US); Russell A. Bauer, Austin, TX (US); Kempton W. Redhead, Huntington Beach, CA (US)

(73) Assignee: Certance LLC, San Jose, CA (US)

( * ) Notice: Subject to any disclaimer, the term of this patent is extended or adjusted under 35 U.S.C. 154(b) by 1579 days.

(21) Appl. No.: 09/911,740

(22) Filed: Jul. 25, 2001

Related U.S. Application Data

(60) Provisional application No. 60/221,222, filed on Jul. 25, 2000.

(51) Int. Cl.
G03B 1/58 (2006.01)
G11B 15/66 (2006.01)
(52) U.S. Cl. ............... 242/332.8; 242/332.4; 242/332.5
(58) Field of Classification Search ............... 242/332.8, 242/332.4, 332.5
See application file for complete search history.

(56) References Cited

U.S. PATENT DOCUMENTS

| 4,399,936 | A | | 8/1983 | Rueger | |
|---|---|---|---|---|---|
| 4,608,614 | A | * | 8/1986 | Rinkleib et al. | 242/332.4 X |
| 4,679,747 | A | * | 7/1987 | Smith | 242/332.4 |
| 4,704,645 | A | | 11/1987 | Murphy et al. | |
| 4,826,101 | A | * | 5/1989 | Smith | 242/332.4 |
| 4,828,201 | A | * | 5/1989 | Smith | 242/332.4 |
| 4,953,044 | A | | 8/1990 | Van Pelt et al. | |
| 5,576,905 | A | | 11/1996 | Garcia et al. | |
| 5,754,361 | A | | 5/1998 | Sakai et al. | |
| 6,034,839 | A | | 3/2000 | Hamming | |
| 6,079,651 | A | * | 6/2000 | Hamming | 242/332.4 |
| 6,082,652 | A | * | 7/2000 | Theobald | 242/332.4 |
| 6,378,796 | B1 | * | 4/2002 | Hamming et al. | 242/332.4 |

FOREIGN PATENT DOCUMENTS

EP   0 467 143 A2 * 1/1992 .............. 242/332.4

* cited by examiner

*Primary Examiner*—Sang Kim
(74) *Attorney, Agent, or Firm*—Baker Botts L.L.P.

(57) ABSTRACT

A method and apparatus for preventing the detachment of an end of tape from a hub filler during movement of the hub filler along a guide rail during an unloading operation of a tape drive mechanism. Detachment is prevented by a retracting tape dragging the hub filler along the guide rail, so as to maintain adequate tension that prevents detachment of the tape from the hub filler. The hub filler, which is coupled to the tape, guide arm, and guide rail, provides adequate drag force to maintain tension in the tape and prevent damage to the tape or the tape drive mechanism.

17 Claims, 5 Drawing Sheets

METHOD AND APPARATUS OF MAINTAINING TENSION IN A TAPE

This application claims priority from U.S. Provisional Patent Application Ser. No. 60/221,222, filed Jul. 25, 2000.

FIELD OF THE INVENTION

The present invention relates to a method and apparatus to maintain tension in a tape being unloaded from a tape drive mechanism.

DESCRIPTION OF RELATED ART

Single reel tape cartridges are used to transport and store tape for reel-to-reel tape drives. A single reel tape cartridge is inserted into a tape drive and a mechanism is used to load the end of the tape into a take-up reel from the tape cartridge. Once the end of the tape is loaded into the take-up reel, the tape drive operates as a reel-to-reel tape drive. A motor is coupled to the take-up reel to rotate the take-up reel about the take-up reel axis and another motor is coupled to the single reel tape cartridge to rotate the reel of the tape cartridge about its axis.

The tape drive loading mechanism attaches to a tape leader pin, located at the end of the tape contained in the single reel tape cartridge. The hub filler uses a slot in the hub filler for receiving the tape leader pin. The hub filler is coupled to a guide arm that drives the hub filler between the single reel tape cartridge and the take-up reel. An example of a mechanism for driving the hub filler between the tape cartridge and the take-up reel is disclosed in U.S. Pat. No. 6,034,839.

FIG. 1 is a view of the tape drive loading mechanism disclosed in U.S. Pat. No. 6,034,839. During a loading operation, the hub filler 300 enters into the cartridge 210 and attaches to the end of the tape. The guide arm 250 then drives the hub filler 300 along the guide rail 247, trailing the tape across the read/write head 222 and into the take-up reel 242. The hub filler 300 enters the take-up reel 242 through a channel 244 and into the hub 245 of the take-up reel 242.

During an unloading operation, the hub filler 300 exits the take-up reel 242 and is driven by the guide arm 250 along the guide rail 247 back into the cartridge 210. In the cartridge 210, the hub filler 300 detaches from the end of the tape. As the hub filler 300 is driven by the guide arm 250, a motor (not shown) coupled to the single reel (not shown) of the single reel tape cartridge 210 retracts the tape back into the tape cartridge 210. This retraction serves the purpose of taking up the slack in the tape created by the movement of the hub filler 300 toward the cartridge 210.

FIG. 2 is a top view of the tape drive, depicting the hub filler 300 in the take-up reel 242 with the tape 216 attached. The tape 216 passes across the read/write head 222 and the end of the tape 216 is secured to the take-up reel 242. The tape drive is then operated by rotation of the take-up reel 242 and the single reel of the cartridge 210 about their respective axes to move the tape 216 across the read/write head 222. Motors are used to rotate the take-up reel 242 and the single reel of the cartridge 210, controlling the speed of the tape 216 as it moves across the read/write head 222. The hub filler 300 pivots on an axle 252 that is coupled to the guide arm 250. This pivoting is necessary for the hub filler 300 to be guided on the guide rail 247 into the take-up reel 242. Once the hub filler 300 is in the take-up reel 242, with the tape 216 attached, the take-up reel 242 rotates to thereby unload the tape from the cartridge 210. The hub filler 300 rotates with the take-up reel 242 on the axle 252. The loading mechanism attempts to align the axle 252 axis and the take-up reel 242 axis perfectly.

There are some concerns regarding the conventional tape drive loading mechanism described above. During the unloading operation of the tape drive mechanism, the motor (not shown) coupled to the tape cartridge 210 and the guide arm motor (not shown) which drives the guide arm 250 must act cooperatively in order to maintain adequate tension in the tape 216 that is attached to the hub filler 300. If the tape 216 is not under adequate tension, there is a risk that the end of the tape 216 will detach from the hub filler 300 prior to the end of the tape 216 being retracted into the cartridge 210. The motor coupled to the tape cartridge 210 and the guide arm motor are separately calibrated. Over time there is the possibility that one of the motors will run faster or slower than intended or originally calibrated. When this occurs, the tension in the tape 216 may be decreased and result in the detachment of the end of the tape 216 from the hub filler 300. If the end of the tape is inadvertently detached in this manner, the tape 216 will become loose and unguided in the tape drive mechanism. One problem with such a detachment is that the tape drive mechanism may be "jammed" by the loose unguided tapes. For instance, the loose tape may become caught between the hub filler 300 and the guide rail 247. This unfortunate situation may prevent movement of the hub filler 300, while torque is being applied to the hub filler 300 by the guide arm 250. Consequently, an undue amount of pressure may be applied to the parts of the tape drive mechanism, permanently damaging the device. One of ordinary skill in the art would recognize other ways that a loose tape could damage or "jam" a tape drive mechanism, rendering such a tape drive mechanism inoperable. Another adverse effect of a loose and unguided tape is that the tape itself may be damaged as it is retracted back into the cartridge 210 in an unguided manner. Consequently, information stored on the tape may be permanently lost. A tape drive mechanism that loses information is considered unreliable.

SUMMARY OF THE INVENTION

There is a need for a tape drive loading mechanism that can effectively maintain tension in a tape during an unloading operation to prevent the end of the tape from being inadvertently detached from the hub filler.

These and other needs are met by embodiments of the present invention, which ensure tension at an end of tape attached to a hub filler during movement of the hub filler along a guide rail during an unloading operation. The present invention reduces the probability that an end of the tape will be inadvertently detached from a hub filler during this unloading operation.

The tape loading mechanism of the present invention, during an unloading operation, uses a motor coupled to a tape cartridge to retract tape that is attached to a hub filler. The retracting tape drags the hub filler and guide arm towards the cartridge. In embodiments of the present invention, the frictional resistance of the hub filler, frictional resistance of the guide arm, the frictional resistance of the guide arm motor, and the magnetic resistance of the guide arm motor maintain adequate tension in the tape. In embodiments of the present invention, additional tension is provided by stimulated electrical induction within the guide arm motor.

The foregoing and other features, aspects, and advantages of the present invention will become more apparent from the following detailed description of the present invention, taken in conjunction with the accompanying drawings.

DETAILED DESCRIPTION OF THE INVENTION

The present invention relates to a method and apparatus for unloading tape from a take-up reel to a single reel tape cartridge in a tape drive mechanism. The present invention maintains tension in the tape to prevent the detachment of the end of the tape from a hub filler during an unloading operation. The end of the tape is attached to a hub filler by a leader pin. The other end of the tape is wrapped around the reel of the single reel tape cartridge. The single reel tape cartridge is coupled to a motor that is arranged to rotate the single reel tape of the cartridge to retract the tape into the cartridge. As tape is being retracted into the cartridge, the hub filler is dragged along the guide rail, with the end of the tape attached. The hub filler and the tape drive mechanism components that are attached to the hub filler provide adequate drag force to maintain tension in the tape, as the tape is being retracted. This tension is necessary to ensure that the tape remains attached to the hub filler. The forces applied to the hub filler during an unloading operation that produce the necessary drag force are the frictional resistance between the hub filler and the guide rail and the force on the hub filler from the guide arm. The force on the hub filler from the guide arm can be attributed to the resistance of the guide arm motor on the movement of the attached guide arm. This resistance of the guide arm motor can either be electrically induced by the guide arm motor, attributed to the frictional resistance of the guide arm motor, or attributed to the magnetic resistance of the guide arm motor.

Figure 1:
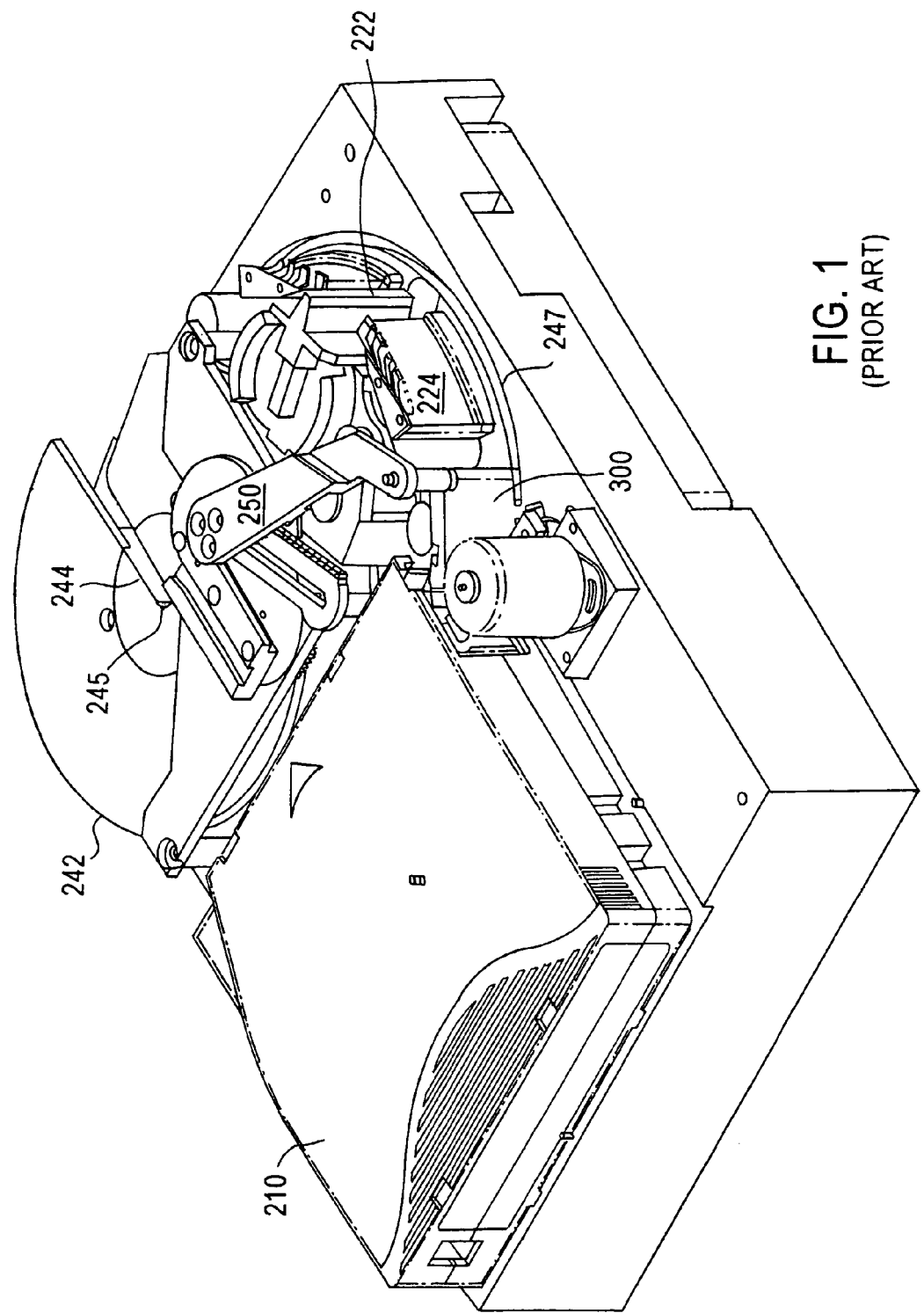
FIG. 1 is a view of a prior art tape drive loading mechanism.
Figure 2:
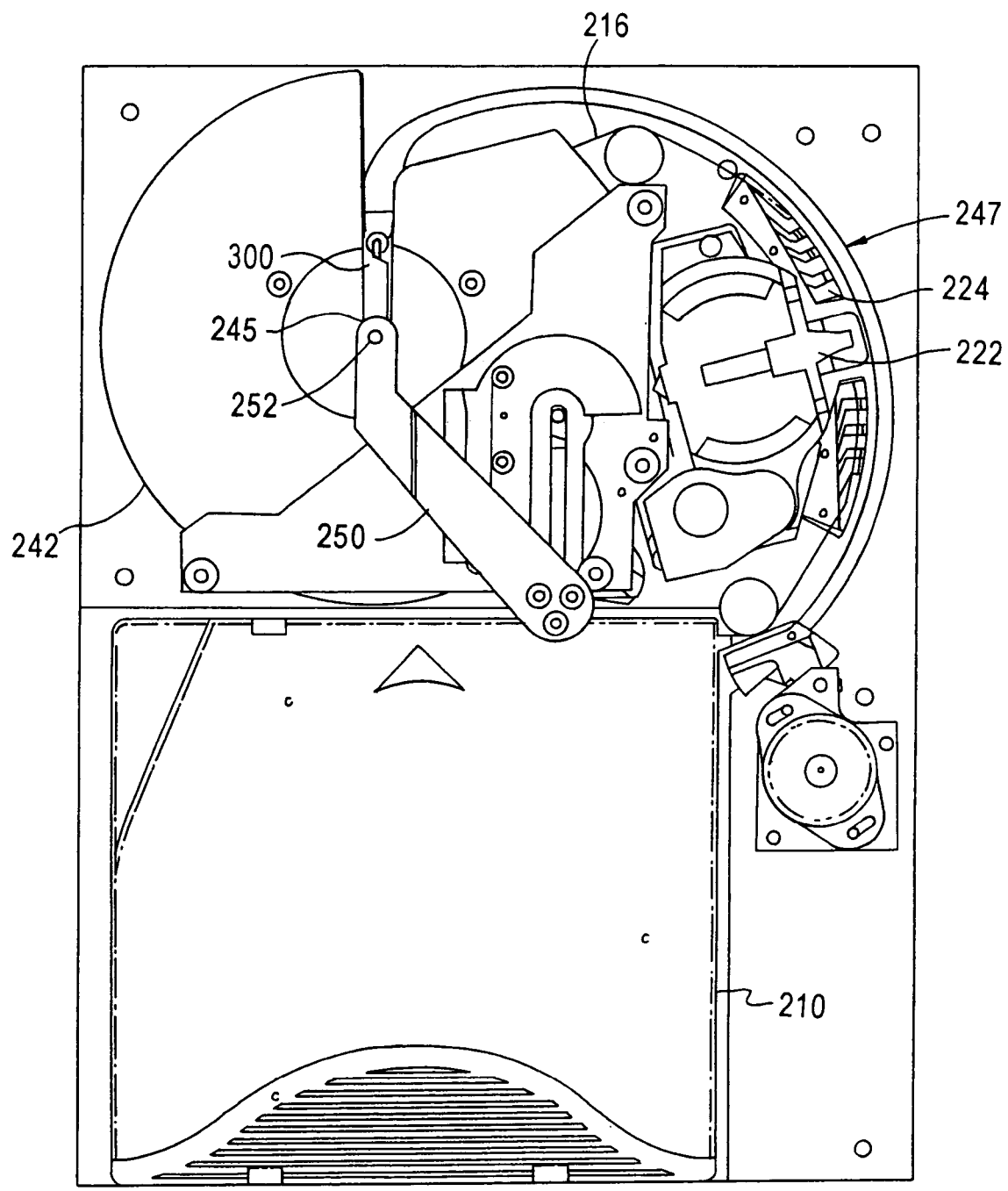
FIG. 2 is a top view of the prior art tape drive loading mechanism.
Figure 3:
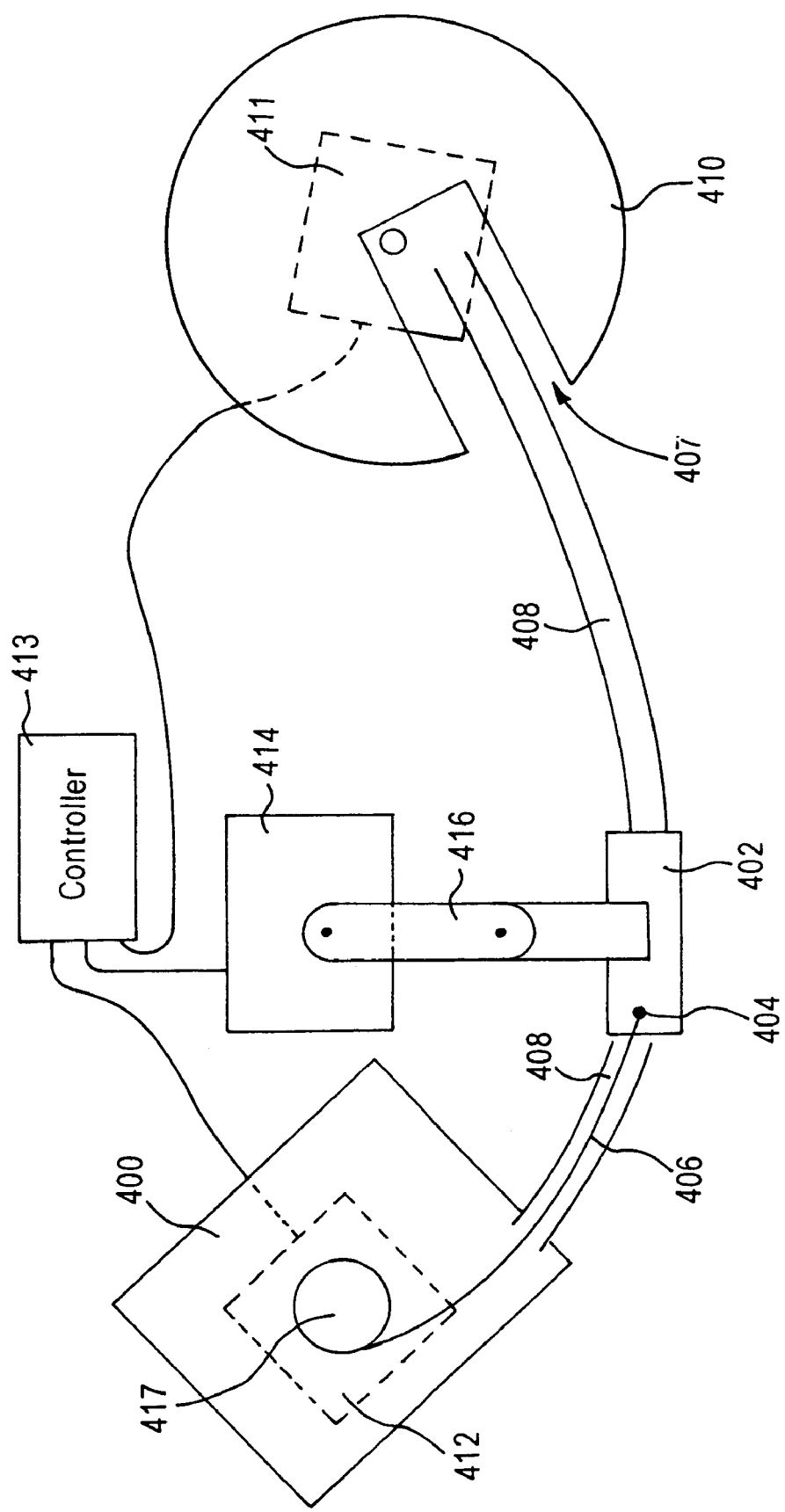
FIG. 3 is a diagram exemplifying the relationship between some of the components of a tape drive mechanism in accordance with the present invention.

FIG. 3 is a diagram exemplifying the relationship between the components of a tape drive mechanism of the present invention. The hub filler 402 is shown riding along the guide rail 408, with tape 406 attached. The end of the tape 406 is fixedly attached to a leader pin 404, which is releasably attached to the hub filler 402. The other end of the tape 406 is wound around the single reel 417 of cartridge 400. The single reel 417 is mechanically coupled to a cartridge reel motor 412. The cartridge reel motor 412 rotates during a tape unloading operation to retract the tape 406 into the tape cartridge 400.

During a tape loading operation, the hub filler 402 attaches to the leader pin 404 in the tape cartridge 400. The hub filler 402 is then driven to the take-up reel 410 by the guide arm 416 and the guide arm motor 414 along the guide rail 408. As the hub filler 402 is transported to the take-up reel 410, tape 406 is dragged out of the cartridge 400. The hub filler 402 then attaches to the take-up reel 410, attaching the tape 406 to the take-up reel 410. The hub filler 402 is shaped to fit into the take-up reel 410 at the take-up reel opening 407. The take-up reel 410 and the hub filler 402 are designed such that when the tape 406 is attached to the take-up reel 410, the take-up reel 410 can be rotated by a take-up reel motor 411 to wrap or unwrap tape 406 around the take-up reel 410 during a read/write operation.

During the tape read/write operation, the hub filler 402, leader pin 404, and tape 406 are attached to the take-up reel 410. The take-up reel 410 and the single reel 417 are rotated to run the tape across a read/write head (not shown) for exchange of data between the tape drive mechanism and the tape 406.

During the tape unloading operation, the hub filler 402, with the attached leader pin 404, are transported from the take-up reel 410 along the guide rail 408 to the tape cartridge 400. Upon the hub filler 402 and leader pin 404 being retracted into the tape cartridge 400, the leader pin 404 is detached from the hub filler 402 in a calculated manner.

The cartridge reel motor 412, guide arm motor 414, and take-up reel motor 411 are electrical motors controlled by a controller 413 during the loading, read/write, and unloading operations. The controller 413 provides electrical power and/or control signals to these motors 411, 412, 414 to control the magnitude and direction of the motor movements. Different combinations of motor movements are necessary during the different operations. For instance, during a loading operation, the guide arm motor 414 is induced to cause the guide arm 416 to drive the hub filler 402 to the take-up reel 410.

During an unloading operation, in accordance with the present invention, the cartridge reel motor 412 rotates the single reel 417 such that the tape 406 is retracted into the cartridge 400 by the tape 406 being wound around the single reel 417. Tension is maintained in the tape 406 at the hub filler 402, such that it is ensured that the leader pin 404 will not be inadvertently detached from the hub filler 402 during transport along the guide rail 408. This tension is maintained by the drag force the hub filler 402 exerts on the tape 406 as the tape 406 retracts into the cartridge 400. The drag force may be considered one type of means for preventing detachment of an end of tape 406 from the hub filler 402 during movement of the hub filler 402 along the guide rail 408 during an unloading operation.

In embodiments of the present invention, this drag force is at least partially attributed to the frictional resistance between the hub filler 402 and the guide rail 408.

In certain embodiments of the present invention, the drag force is at least partially attributed to the frictional resistance within the guide arm 416, as the guide arm 416 is pulled by the retracting tape 406. The guide arm 416 may comprise a plurality of moving parts that are mechanically coupled to one another. The mechanical coupling produces a frictional resistance during movement of the guide arm 416.

In certain embodiments of the present invention, the drag force is at least partially attributed to the force exerted on the hub filler 402 through the guide arm 416 by the guide arm motor 414. The force exerted by the guide arm motor 414 is at least partially attributed to the magnetic resistance produced by the interaction of the windings and magnetic material of the guide arm motor 414. In these embodiments, the guide arm motor 414 is an induction motor. However, in other embodiments of the present invention, the guide arm motor 414 is not limited to an induction motor.

Furthermore, in certain embodiments of the present invention, the force exerted by the guide arm motor 414 is at least partially attributed to the frictional resistance within the guide arm motor 414. As one of ordinary skill in the art recognizes a motor comprises of a plurality of moving parts mechanically coupled to one another. During movement of the guide arm motor 414 by the dragging of the hub filler 402 by the tape 406, there is a resistance to the movement by the friction between the plurality of moving parts.

In embodiments of the present invention, the force exerted by the guide arm motor 414 is at least partially attributed to the electrically induced force of the guide arm motor 414. In these embodiments, the guide arm motor 414 will be electrically induced to increase or decrease the drag force on the hub filler 402. It is desirable that the total drag force on the hub filler must be adequate to maintain tension in the tape 406, so that the tape 406 remains attached to the hub filler 402 during an unloading operation. However, the drag force must not be too great, as to stretch, break, or otherwise damage the tape 406 during an unloading operation.

Hence, with the present invention, the tape is not transported back to the single reel by the hub filler, with the cartridge reel motor 412 operating only to take up slack, as in the prior art. Rather, it is the cartridge reel motor 412 that provides the torque to pull the tape 406 into the single reel 417, in the present invention. Tension in the tape 406 is controlled through the guide arm motor 414, guide arm 416 and hub filler 402 combination. This tensioning can be passive, such as simply allowing the frictional forces and other forces to act counter to the pulling by the cartridge reel motor 412. The tensioning can be more active, as described above, by controlling the guide arm motor 414 to change the amount of drag provided at the hub filler 402.

Figure 4:
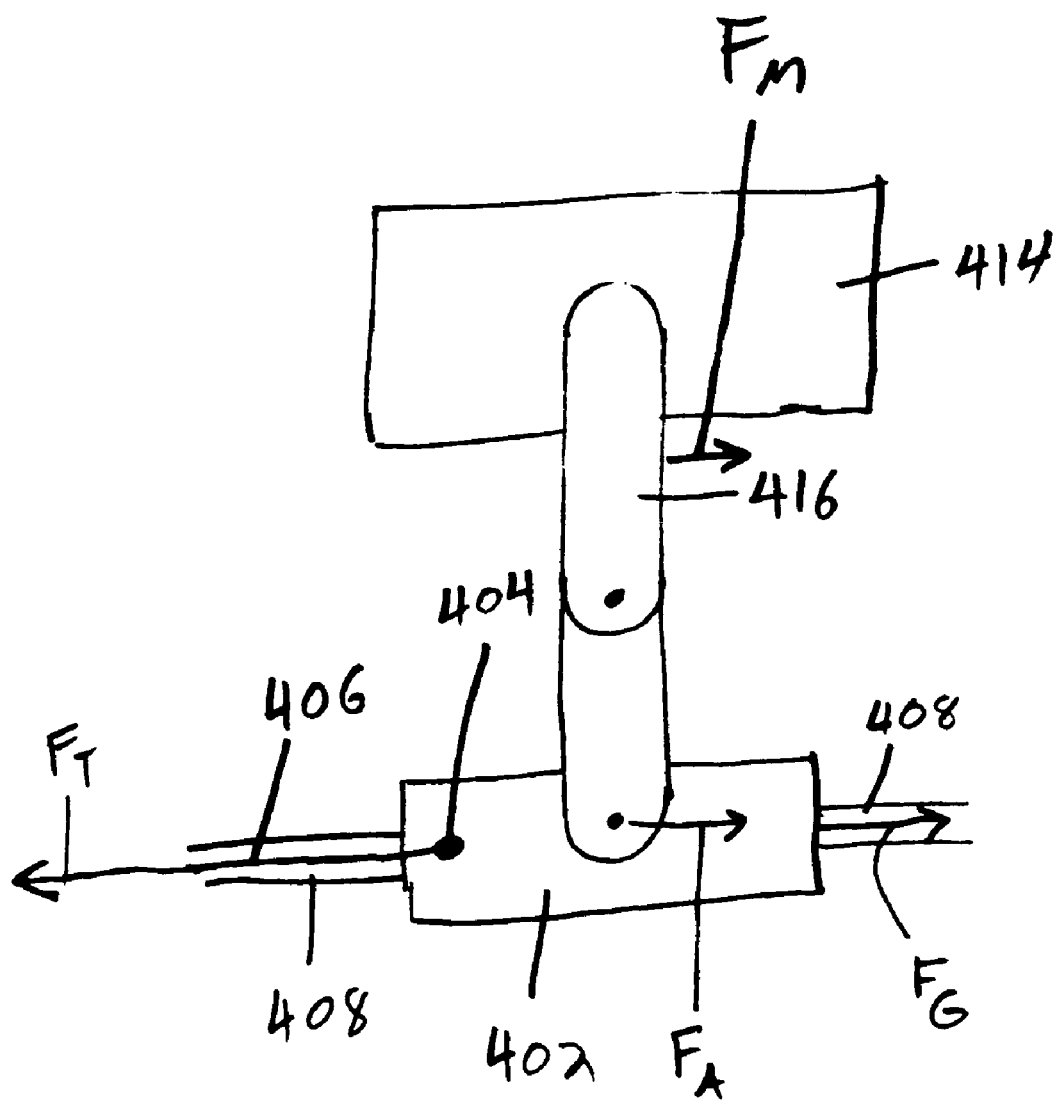
FIGS. 4 and 5 are free body diagrams of the hub filler and the relevant forces applied to the hub filler during an unloading operation.
Figure 5:
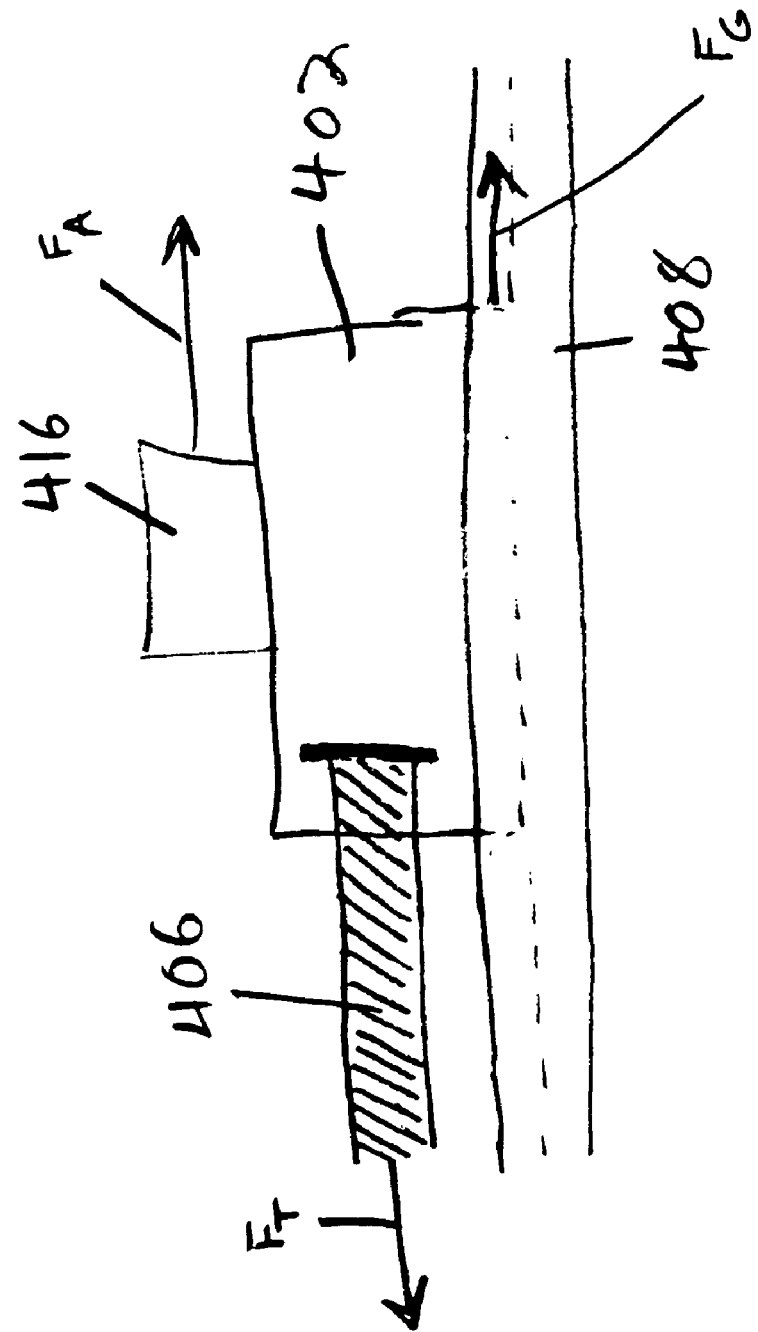

FIGS. 4 and 5 are free body diagrams of the hub filler and the relevant forces applied to the hub filler during an unloading operation. FIG. 4 is a top view and FIG. 5 is a side view. Force $F_T$ is the force applied by the tape 406 to the hub filler 402 through the attached leader pin 404. Force $F_G$ is the force applied to the hub filler 402 by the friction between the hub filler 402 and the guide rail 408. Force $F_A$ is the force applied to the hub filler 402 by the guide arm 416. Force $F_M$ is the force of the guide arm motor 414, which at least partially attributes to the force $F_A$. Force $F_M$ can be a function of the magnetic resistance, frictional resistance, and/or electrically induced force of the guide arm motor 414.

The controller 413 is a conventional controller configured by one of ordinary skill in the art to control the motors 412 and 414 to maintain tension in the tape 406, based on the forces shown in FIGS. 4 and 5. Such forces can be empirically determined for a tape drive model. Alternatively, sensors are provided to measure the forces and provide these measurements to the controller 413.

The present invention provides an improved method and apparatus of preventing the detachment of an end of tape from hub filler during movement of the hub filler along a guide rail during an unloading operation of a tape drive mechanism. Detachment is prevented by a retracting tape dragging the hub filler along the guide rail, so as to maintain adequate tension that prevents detachment of the tape from the hub filler. The hub filler, which is coupled to the tape, guide arm, and guide rail, is arranged to have adequate drag force to maintain tension in the tape and prevent damage to the tape. The drag force is at least partially attributed to the frictional forces of the hub filler, guide rail, guide arm, and guide arm motor. Further, the drag force may be at least partially attributed to and controlled by the magnetic resistance of the guide arm motor and/or the electrical induction of the guide arm motor.

Although the present invention has been described and illustrated in detail, it is to be clearly understood that the same is by way of illustration and example only, and is not to be taken by way of limitation, the scope of the present invention being limited only by the terms of the appended claims.

What is claimed is:

1. A tape drive mechanism comprising:
 a hub filler coupled to a guide rail;
 means for preventing detachment of an end of tape from the hub filler during a tape unloading operation, wherein the means for preventing detachment comprises:
 a guide arm coupled to the hub filler; and
 a guide arm motor coupled to the guide arm, and wherein the guide arm and guide arm motor are arranged to be dragged by the tape being unloaded from the tape drive mechanism.

2. The tape drive mechanism of the claim 1, wherein:
 the guide arm and the guide arm motor are arranged to provide drag on the tape being unloaded from the tape drive mechanism.

3. The tape drive mechanism of claim 2, wherein:
 the guide arm motor under control of a controller is arranged to provide tension on the tape by electrical induction within the guide arm motor.

4. The tape drive mechanism of claim 3, wherein the electrical induction, frictional resistance of the hub filler, and frictional resistance of the guide arm applies force to the hub filler in an opposite direction to a direction that the hub filler is traveling in the unloading operation.

5. The tape drive mechanism of claim 2, wherein the guide arm motor is arranged to provide tension by magnetic resistance within the guide arm motor.

6. The tape drive mechanism of claim 5, wherein the magnetic resistance of the guide arm motor, frictional resistance of the guide arm motor, frictional resistance of the hub filler, and frictional resistance of the guide arm apply force to the hub filler in an opposite direction to a direction that the hub filler is traveling in the unloading operation.

7. A tape drive mechanism comprising:
 a hub filler coupled to a guide rail;
 a guide arm coupled to the hub filler; and
 a guide arm motor coupled to the guide arm, wherein the guide arm and the guide arm motor are arranged to controllably drag on a tape and thereby prevent detachment of an end of the tape from the hub filler during movement of the hub filler along the guide rail during an unload operation.

8. The tape drive mechanism of claim 7 wherein the guide arm and the guide arm motor are arranged to be dragged by the tape being unloaded from the tape drive mechanism.

9. The tape drive mechanism of claim 8, wherein the guide arm motor is arranged to provide tension by magnetic resistance within the guide arm motor.

10. The tape drive mechanism of claim 9, wherein the magnetic resistance of the guide arm motor, frictional resistance of the guide arm motor, frictional resistance of the hub filler, and frictional resistance of the guide arm apply force to the hub filler in an opposite direction that the hub filler is traveling in the unloading direction.

11. The tap drive mechanism of claim 7 wherein the guide arm motor under control of a controller is arranged to provide tension by stimulated electrical induction within the guide arm motor.

12. The tape drive mechanism of claim 11, wherein the electrical induction, frictional resistance of the hub filler, and frictional resistance of the guide arm applies torque to the hub filler in the opposite direction to a direction that the hub filler is traveling in the unloading operation.

13. A method of preventing detachment of an end of tape from a hub filler during movement of the hub filler along a guide rail during an unload operation, comprising the steps of:
 driving an end of tape with a tape cartridge motor in a direction away from a take-up reel; and
 controllably applying tension to the end of the tape in a direction toward the take-up reel.

14. The method of claim 13, wherein:
the step of applying tension comprises the further steps of:
provo tension through a guide arm coupled to the hub filler; and
providing tension through a guide arm motor coupled to the guide arm.

15. The method of claim 14, wherein the step of providing tension through a guide arm motor comprises the further step of providing tension in the guide arm motor through electrical induction within the guide arm motor.

16. The method of claim 14, wherein the step of providing tension through a guide arm motor comprises the further step of providing tension in the guide arm motor through magnetic resistance within the guide arm motor.

17. The method of claim 14, wherein the step of providing tension through a guide arm comprises the further step of providing tension in the guide arm through frictional resistance of the guide arm.

* * * * *